United States Patent [19]

Luthra et al.

[11] 4,340,399

[45] Jul. 20, 1982

[54] METHOD OF REMOVING ALKALI METAL CONTAMINATION FROM A GASEOUS STREAM

[75] Inventors: Krishan L. Luthra, Schenectady, N.Y.; Henry S. Spacil, Tokyo, Japan

[73] Assignee: General Electric Company, Schenectady, N.Y.

[21] Appl. No.: 218,991

[22] Filed: Dec. 22, 1980

[51] Int. Cl.³ .............................................. B01D 53/12
[52] U.S. Cl. ............................................ 55/72; 55/5; 55/75
[58] Field of Search ...................... 55/72, 74, 75, 77, 5; 423/215.5, 625, 335; 252/454; 204/164

[56] References Cited

U.S. PATENT DOCUMENTS

| | | | |
|---|---|---|---|
| 3,750,372 | 8/1973 | St. Cyr et al. | 55/75 |
| 4,120,668 | 10/1978 | Fraley | 55/72 |
| 4,239,504 | 12/1980 | Polizzotti et al. | 55/5 |
| 4,256,703 | 3/1981 | Dixit et al. | 55/5 |
| 4,294,588 | 10/1981 | Polizzotti et al. | 55/5 |

FOREIGN PATENT DOCUMENTS 607955 11/1960 Canada .................................... 55/80

OTHER PUBLICATIONS

Formenti et al., "Preparation of Ultrafine Metal Oxide Particles," published in *J. Of Colloid & Interface Sci.*, vol. 39, Apr. 1972.
Juillet et al., "Inorganic Oxide Aerosols", published in *Faraday Symposia of the Chem. Soc.*, No. 7, 1973, pp. 57–76.
Lee et al., "Regeneration of Activated Bauxite", published by The American Society of Mech. Eng., #80-GT-165, Jan 1980.
Lee et al., "Removal of Gaseous Alkali Metal," published by The Am. Soc. of Mech. Eng., #79-GT-154, Jan. 1979.
Formenti et al., "Preparation in a Hydrogen-Oxygen Flame", *Journal of Colloid and Interface Science*, vol. 39, Apr. 1972 pp. 79–89.
Regeneration of Activated Bauxite Used as a Granular Sorbent for Removing Gaseous Alkali Metal Compounds from Hot Flue Gas, Lee et al, ASME Publication, 3/10/80.
Removal of Gaseous Alkali Metal Compounds from Hot Flue Gas by Particulate Sorbents, Lee et al. ASME Publication, 3/12/79.

*Primary Examiner*—Gregory N. Clements
*Attorney, Agent, or Firm*—William A. Teoli; James C. Davis, Jr.

[57] ABSTRACT

A method is described for effecting the removal of alkali metal contaminants from a super heated gaseous mixture useful in power generation. Finely divided refractory oxide particles are introduced into the hot gaseous mixture without effecting a substantial reduction in the temperature and operating efficiency of the system. The alkali metal contaminants are substantially removed from the hot gaseous mixture by being adsorbed onto the surface of the finely divided refractory oxide particles.

11 Claims, 1 Drawing Figure

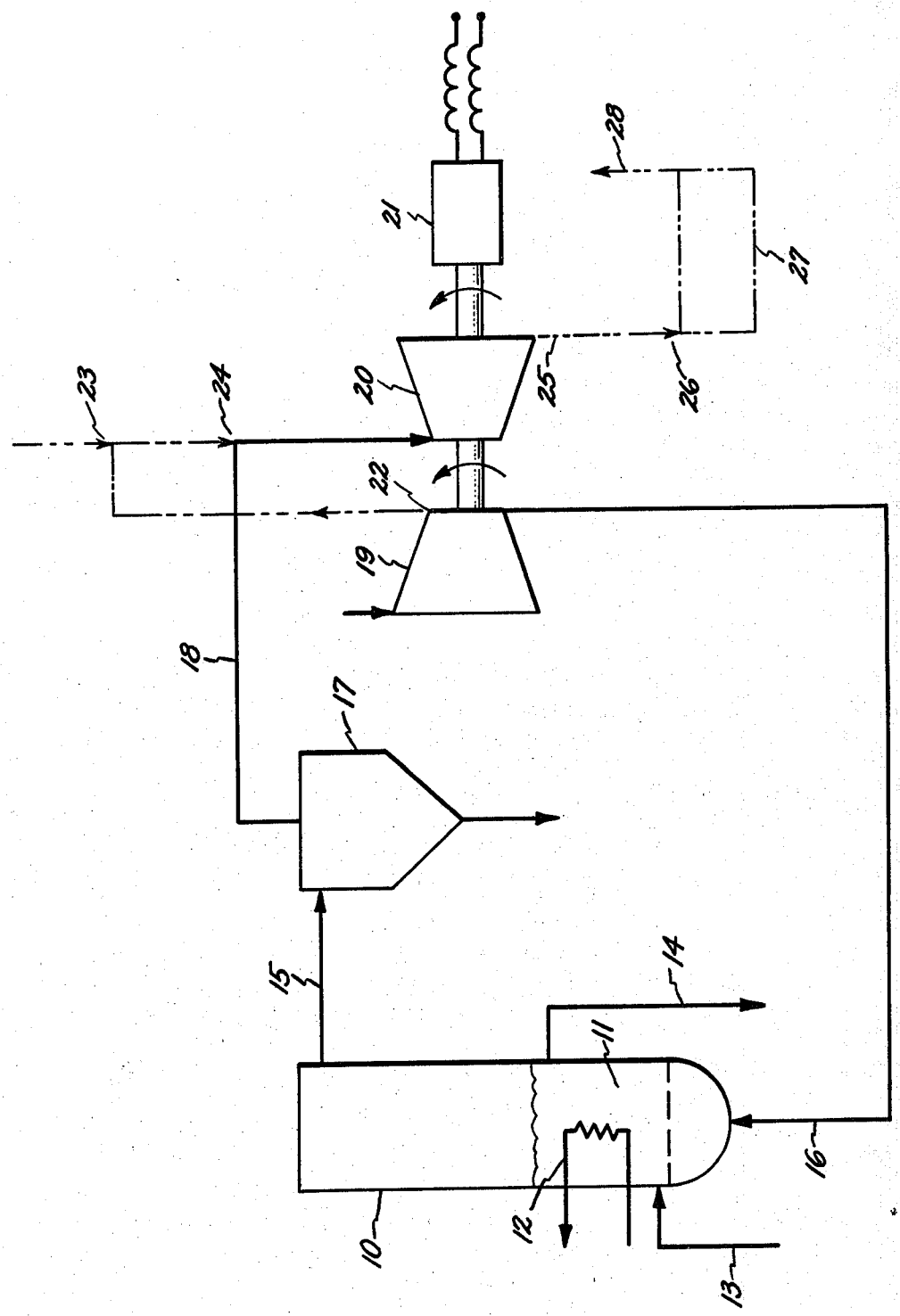

METHOD OF REMOVING ALKALI METAL CONTAMINATION FROM A GASEOUS STREAM

CROSS REFERENCE TO RELATED APPLICATIONS

Reference is made to copending application Ser. No. 17,613, (now abandoned) W. B. Giles et al, Removal of Alkali Composition From a Hot Gas, Filed Mar. 5, 1979 and assigned to the same assignee as the present invention.

BACKGROUND OF THE INVENTION

The present invention relates to a method of removing alkali metal compounds from heated gaseous mixtures useful in power generation by introducing finely divided refractory oxides into the gaseous mixtures. Removal of the alkali metal compounds from the gaseous mixtures is principally achieved by the adsorption of the alkali metal compounds onto the surface of the introduced finely divided refractory oxides without effecting a reduction in the temperature of the heated gaseous mixtures.

Prior to the present invention, pressurized fluidized bed coal combustors have been evaluated for power generation in combined cycle power plants. The resulting combustion gases are cleaned of fly ash and expanded in a gas turbine generating power. The cleaned combustion gases contain high concentrations of alkali salts. Experience with oil-fired turbines has shown that gas turbine components are often severely corroded by alkali metal sulfates arising from the reaction of sulfur oxides and alkali metal salt vapors present in combustion gases.

One method of protecting the gas turbine components from alkali metal sulfate corrosion is by using a metallic coating on the surface of gas turbine components. A number of coatings based on MCrAlY compositions, where M stands for Ni, Co or Fe, or aluminide coatings having been used. However, due to severity of the gas environment in coal fired systems, alternate systems may be needed to insure adequate protection.

Another procedure which has been taught to protect gas turbine components from alkali metal corrosion is by effecting the removal of the alkali metal contaminant by condensation of the alkali compound vapor at a temperature of about 1650° F. at a pressure of about 10 atmospheres onto cooler metal oxide particles at a temperature of about 1550° F. or below, having a preferred diameter of from about 50 to about 150 microns introduced into the hot gaseous mixture prior to the power generation step as shown in copending application Ser. No. 17,613. Condensation of volatilized metal compounds from a gaseous stream in molten salt processing onto particulate is also shown in U.S. Pat. No. 4,120,668. Although condensation of alkali metal vapor is an effective way to remove such contaminants from hot gaseous mixtures useful in power generation, the overall efficiency of the power generation system is reduced, since the temperature of the mixture is lowered upon contacting the cooler refractory oxide particles. In addition, the alkali metal compound content of the hot gaseous mixture can be reduced only to the saturation vapor pressure which is the level above which condensation occurs. In some instances, the condensation level can be very high for particular gas compositions which may exceed the tolerance limit of the gas turbine components. Accordingly, the resulting super heated gaseous mixture can exceed the acceptable tolerence limit of 0.02 ppm which has been found suitable in oil fired turbines. It is also known that some removal of alkali metal contaminants can occur through chemical reaction with metal oxide particles such as alumino silicates. However, removal of such contaminants to acceptable levels through chemical reaction with refractory oxide particles can only occur at temperatures below gas turbine requirements.

It has been further reported by Lee and Johnson in "Removal of Gaseous Alkali Metal Compounds from Hot flue Gas by Particulate Sorbents", ASME paper No. 79-GT-154, Gas Turbine Conference, San Diego, Calif. Mar. 25-15, 1979, that alkali content of simulated flue gas can be reduced by adsorption on contact with activated bauxite at elevated temperatures.

It is an object of the present invention, therefore, to effect removal of alkali metal contamination in super heated gaseous mixtures used in power generation without effecting a substantial reduction in the temperature of the gaseous mixture.

It is a further object of the present invention to effect the removal of alkali metal contaminants from heated gaseous mixtures by introducing finely divided refractory oxide material into the super heated gaseous mixture before such heated gaseous mixture becomes in contact with gas turbine components.

Other objects of the present invention will be apparent from the following description of the present invention.

STATEMENT OF THE INVENTION

In the method of removing alkali metal compounds from a gaseous mixture superheated to a temperature suitable for power generation, which contains such alkali metal compounds in vaporous form, comprising, contacting the superheated gaseous mixture with a plurality of dispersed refractory oxide particles having an average diameter from $50\mu$ to $100\mu$ and at a temperature of at least 100° F. below the temperature of such superheated gaseous mixture and for a sufficient length of time to effect the condensation of such alkali metal compound vapor onto the surface of such refractory oxide particles, which thereafter are separated from the superheated gaseous mixture, whereby the resulting superheated gaseous mixture suffers a significant drop in temperature which reduces the operating efficiency of the power generation system, the improvement which comprises, introducing into the superheated gaseous mixture finely divided refractory oxide particles having an average particle size of from $0.005\mu$ to $1\mu$ at substantially the same temperature as the superheated gaseous mixture, whereby adsorption instead of condensation of the vaporous alkali metal compound is substantially effected onto the surface of such finely divided refractory oxide particles, which are utilized in an amount to provide a total surface area sufficient to reduce the level of alkali metal contamination in such superheated gaseous mixture to an acceptable value while the temperature of the superheated gaseous mixture and operating efficiency of the overall power generation system is substantially maintained.

The finely divided refractory oxide particles which can be utilized in the practice of the present invention include, for example, spherical particles of $SiO_2$, $Al_2O_3$, $Fe_2O_3$, $TiO_2$, or $ZrO_2$ having a uniform radii in the range of from about $0.005\mu$ to about $1\mu$. These refractory oxide particles are well known materials and can be made by techniques shown by F. Juillet et al, Inorganic Oxide Aerosols of Controlled Submicronic Dimensions, Faraday Symposium of the Chemical Society, 7, 57, 1973, and M. Formenti et al, Preparation in a Hydrogen-Oxygen Flame of Ultrafine Metal Oxide Particles, Journal of Colloid and Interface Science, Vol. 39, No. 1, April 1972, pages 79-89. A typical reaction, for example, involves the decomposition of the anhydrous inorganic chloride vapor in the hydrogen-oxygen flame of a diffusion multi-tubular burner. There is produced particles having a dimension in the range of from about $0.005\mu$ to $1\mu$. These particles are virtually innocuous to gas turbine coating materials because they are so small that they will follow the gas stream and will not cause damage to the gas turbine components. Although adsorption of the alkali metal contaminant is believed to occur on the surface of these small particles allowing for the reduction of alkali metal contamination to acceptable limits, a certain level of chemical reaction enhanced by these small particles also can occur.

In order that those skilled in the art will be better able to understand the method of the present invention, reference is made to the drawings, where there is shown a schematic of a pressurized fluid bed reactor used to generate a hot gaseous mixture for the purpose of energizing a gas turbine and electric generator coupled thereto and hot steam for use in steam turbines or boilers.

There is shown in phantom a source of finely divided refractory oxide particles which meets the hot gaseous mixture prior to its passage through the turbine and the conveyance of the mixture charged with the refractory oxide particles having adsorbed alkali compounds which are passed through the turbine and the resulting gaseous mixture at a substantially reduced temperature and pressure is passed into a collector for particle removal and thereafter exhausted into the atmosphere.

There is shown more particularly at 10, a pressurized fluidized bed coal combustor having a bed of burning coal and limestone at 11 and a superheated steam heat exchanger at 12. A mixture of coal and limestone ($CaCO_3$) or dolomite ($CaCO_3.MgCO_3$) is introduced at 13 and calcium sulfate and unused limestone or dolomite are removed at 14.

An air compressor at 19 delivers pressurized air at 16 at the bottom of the combustor which generates a hot gaseous mixture at 15 which is directed into a cyclone at 17 for the purpose of removing fly ash. The hot gaseous mixture is then conducted at 18 to the gas turbine at 20 joined to a generator at 21.

There is shown at 22, a source of compressed air from compressor 19 which is fed to a multi-orifice burner at 23 to furnish air while the burner can have a separate source of hydrogen, nitrogen and oxygen. Finely divided refractory oxide particles, for example, aluminum oxide, silicon oxide, titanium oxide, etc., are generated at 23 at pressures which are adjusted to provide a positive stream which can meet the incoming hot gaseous mixture at 24 to provide sufficient contact between the finely divided refractory oxide particles and hot gaseous mixture. Various means can be used to effect mixing and to provide sufficient contact time between the refractory oxide particles and the hot gaseous mixture, such as utilizing a spiral pipe or a zigzag pipe, etc. Control valves not shown are between 17 and 24, and 24 and 20 which are used to bleed off a portion of the heated mixture to monitor alkali metal content. The alkali metal content is measured after particles have been removed with an electrostatic precipitator. Alkali metal detection is achieved with the device shown in copending application of Andrew S. Zarchy, Ser. No. 33,257, filed Apr. 25, 1979 and assigned to the same assignee as the present invention. There is used a conduit defining a gas-flow cavity and a metalliferous filament having a work function of at least 5.6 ev extending transversely through the flow path. A heater heats the filament to ionize the alkali metal being detected. A perforated ion-collection member surrounds the filament to define an ionization collection region. A high-voltage (HV) source develops a HV electrical field within the region, thereby effecting neutralization of the ionized metals contacted with the collection member. An ammeter generates a signal in response to the neutralization and proportional to the rate thereof.

The heated gaseous mixture containing the finely divided refractory oxide particles can thereafter be introduced into the turbine at 20 which turns the shaft common to the generator at 21 and the compressor at 19. The gaseous mixture is then exhausted at 25 and forwarded into an electrostatic precipitator 27 through duct 26 and the resulting gases substantially free of refractory oxide particles are vented at 28 into the atmosphere.

In order that those skilled in the art will be better able to practice the invention, the following example is given by way of illustration and not by way of limitation. All parts are by weight.

EXAMPLE

A mixture of coal and dolomite at a flow rate of about $0.163 \times 10^6$ pounds per hour of coal and about $0.0533 \times 10^6$ pounds per hour of dolomite is introduced into a pressurized fluidized bed coal combustor as shown in the drawing. There is used $1.63 \times 10^6$ pounds per hour of air which is 20% in excess of the air needed for combustion. The temperature of the bed is maintained at about 1740° F. by means of the steam heat exchanger shown at 12. Flyash is collected continuously from the heated gas mixture which is directed towards the gas turbine at a gas pressure of about 9 atmospheres. The alkali content of the gaseous mixture is found to be about 0.5-20 ppm, based on a reading with the Zarchy detection device previously described.

In accordance with the procedure described by F. Juliet et al, Inorganic Oxide Aerosols of Controlled Submicronic Dimensions, cited above, a heated mixture of finely divided aluminum oxide particles at a pressure of approximately 9 atmospheres, substantially equivalent to the hot gaseous mixture originating from the pressurized fluidized bed coal combustor is directed through a duct which contacts the cleaned, heated gaseous mixture. There is burned sufficient aluminum chloride in a flame reactor to provide at least 0.004 pound of refractory oxide particles having an average particle size in the range of about $0.01\mu$ per pound of coal consumed in the pressurized fluid bed reactor. The heated gaseous mixture and refractory oxide particles at substantially the same pressure are allowed to thoroughly mix at a temperature of about 1740° F. A portion of the resulting heated mixture is then bled off prior to its entry into the turbine. The mixture is thereafter passed through an electrostatic precipitator to effect the removal of the refractory oxide particles. The resulting mixture is then measured for alkali metal content and is found to contain less than 0.02 ppm of sodium and potassium.

The heated mixture containing the refractory oxide particles is introduced into the gas turbine at a flow rate of about $1.81 \times 10^6$ pounds per hour. The resulting mixture exits from the gas turbine generator and is passed through an electrostatic collector which substantially frees the gas mixture of the finely divided oxide particulate and is thereafter vented into the atmosphere.

Although the above examples are directed to only a few of the very many variables which can be used in the practice of the method of the present invention, it should be understood that the present invention is directed to the use of a much broader variety of particulated refractory oxides or mixtures thereof and the superheated gaseous mixture utilized for power generation can originate from other systems in addition to pressurized fluidized bed coal combustors.

What we claim as new and desire to secure by Letters Patent of the United States is:

1. A method of removing alkali metal compounds from a gaseous mixture superheated to a temperature suitable for power generation which contains such alkali metal compounds in vaporous form comprising,
    (1) introducing into the superheated gaseous mixture finely divided refractory oxide particles having an average diameter of from 0.005 micron to 1 micron which are utilized in an amount sufficient to provide a total adsorption surface area sufficient to reduce the level of alkali metal contamination of the superheated gaseous mixture to an acceptable value prior to the introduction of the superheated gaseous mixture into the gas turbine,
    (2) introducing the resulting heated gaseous mixture into the gas turbine at a flow rate sufficient to energize the gas turbine,
    (3) exhausting the resulting gaseous mixture into a precipitator to effect particle removal, and
    (4) thereafter venting the resulting gases substantially free of refractory oxide particles into the atmosphere.

2. A method in accordance with claim 1, where the finely divided metal oxide particles are finely divided aluminum oxide.

3. A method in accordance with claim 1, where the finely divided refractory oxide particles are finely divided silicon dioxide.

4. A method in accordance with claim 1, where the refractory oxide particles are in the form of a mixture of alumina and silicon oxide.

5. A method in accordance with claim 1, where the refractory oxide particles are in the form of finely divided titanium oxide.

6. A method in accordance with claim 1, where the refractory oxide particles are in the form of finely divided iron oxide.

7. A method in accordance with claim 1, where the refractory oxide particles are in the form of finely divided zirconium oxide.

8. A method in accordance with claim 1, where the superheated gaseous mixture originates in a pressurized fluid bed coal reactor.

9. A method in accordance with claim 1, where the finely divided refractory oxide particles are generated in a flame reactor resulting from the combustion of a metal or metalloid chloride.

10. A method in accordance with claim 1, where the finely divided refractory oxide is generated in a plasma reactor resulting from the combustion of a metal or metalloid chloride.

11. A method in accordance with claim 1, where the finely divided refractory oxide is generated in a reactor based on the combustion of a metal or metalloid chloride at a temperature of at least 1700° F.

* * * * *